US008359988B2

(12) United States Patent
Bassett (10) Patent No.: US 8,359,988 B2
(45) Date of Patent: Jan. 29, 2013

(54) AGRICULTURAL TILLAGE DEVICE

(75) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 12/914,039

(22) Filed: Oct. 28, 2010

(65) Prior Publication Data

US 2011/0036602 A1  Feb. 17, 2011

Related U.S. Application Data

(63) Continuation-in-part of application No. 12/793,140, filed on Jun. 3, 2010, which is a continuation of application No. 12/178,809, filed on Jul. 24, 2008, now Pat. No. 7,743,718.

(60) Provisional application No. 60/961,726, filed on Jul. 24, 2007.

(51) Int. Cl.
*A01B 49/04* (2006.01)

(52) U.S. Cl. ........ 111/135; 111/140; 111/191; 172/536; 172/556

(58) Field of Classification Search .................. 172/287, 172/534, 536, 672, 624.5, 176, 145, 146, 172/149–151, 177, 175, 518, 13, 15, 17, 172/556, 532, 559, 561, 562, 484, 662, 683, 172/456, 196, 540; 111/140, 927, 81, 165, 111/166, 167, 169, 137, 157, 139, 149, 62, 111/85, 52, 190–195; 171/111, 112, 116
See application file for complete search history.

(56) References Cited

U.S. PATENT DOCUMENTS

| 353,491 | A | 2/1886 | Wells |
| 803,088 | A | 10/1905 | Barker |
| 1,134,462 | A | 4/1915 | Kendrick |
| 1,158,023 | A | 10/1915 | Beaver |
| 1,247,744 | A | 11/1917 | Trimble |
| 1,260,752 | A | 3/1918 | Casaday |
| 1,321,040 | A | 11/1919 | Hoffman |

(Continued)

FOREIGN PATENT DOCUMENTS

| BE | 551372 | 10/1956 |
| CA | 530673 | 9/1956 |

(Continued)

OTHER PUBLICATIONS

Farm Journal Article, "Listen to your soil", pp. 14-15, Jan. 1993.

(Continued)

*Primary Examiner* — Robert Pezzuto
*Assistant Examiner* — Matthew D Troutman
(74) *Attorney, Agent, or Firm* — Nixon Peabody LLP (57) ABSTRACT

An agricultural implement for tilling at least a strip of soil to be planted includes a tillage device for penetrating and tilling a strip of soil and displacing soil and residue upwardly, the tillage device including at least one coulter wheel mounted for rotation about a first axis of rotation and positioned at least in part below the soil, when tilling the strip of soil, such that the coulter wheel is able to cut a slit in the soil, and a depth control device laterally offset from the centerline of the strip of soil and mounted for rotation about a second axis of rotation located rearwardly of the trailing end of the tillage device. The depth control device is positioned to intercept soil and residue displaced upwardly by the tillage device. Multiple tines made of a polymeric material are mounted on the depth control device, extending laterally away from only one side of the depth control device toward the centerline to intercept a portion of the soil and residue displaced upwardly by the tillage device.

20 Claims, 7 Drawing Sheets

U.S. PATENT DOCUMENTS

| | | | |
|---|---|---|---|
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A * | 8/1973 | Berg et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,676 A | 2/1979 | Jannen et al. | 417/539 |
| 4,142,589 A | 3/1979 | Schlagenhauf | |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | |
| 4,213,408 A | 7/1980 | West et al. | |
| 4,225,191 A | 9/1980 | Knoski | 301/9 |
| 4,233,803 A | 11/1980 | Davis et al. | 56/14.9 |
| 4,241,674 A | 12/1980 | Mellinger | |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | |
| 4,407,371 A | 10/1983 | Hohl | |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,650,005 A | 3/1987 | Tebben | 172/430 |
| 4,669,550 A | 6/1987 | Sittre | |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | |
| 4,825,957 A | 5/1989 | White et al. | 172/126 |
| 4,825,959 A | 5/1989 | Wilhelm | 172/720 |
| 4,926,767 A | 5/1990 | Thomas | 111/85 |
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | |
| 5,076,180 A | 12/1991 | Schneider | |
| 5,092,255 A | 3/1992 | Long et al. | 111/167 |
| 5,113,957 A | 5/1992 | Tamai et al. | 172/10 |
| 5,129,282 A | 7/1992 | Bassett et al. | |
| 5,234,060 A | 8/1993 | Carter | 172/413 |
| 5,240,080 A | 8/1993 | Bassett et al. | 172/740 |
| 5,255,617 A | 10/1993 | Williams et al. | |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | |
| 5,337,832 A | 8/1994 | Bassett | 172/504 |
| 5,341,754 A | 8/1994 | Winterton | |
| 5,346,019 A | 9/1994 | Kinzenbaw et al. | 172/311 |
| 5,346,020 A | 9/1994 | Bassett | 172/540 |

| | | |
|---|---|---|
| 5,349,911 A | 9/1994 | Holst et al. |
| 5,351,635 A | 10/1994 | Hulicsko ............... 111/135 |
| 5,379,847 A | 1/1995 | Snyder ............... 172/128 |
| 5,394,946 A | 3/1995 | Clifton et al. |
| 5,398,771 A | 3/1995 | Hornung et al. ............... 172/311 |
| 5,443,023 A | 8/1995 | Carroll ............... 111/191 |
| 5,443,125 A | 8/1995 | Clark et al. |
| 5,461,995 A | 10/1995 | Winterton |
| 5,462,124 A | 10/1995 | Rawson |
| 5,473,999 A | 12/1995 | Rawson et al. |
| 5,477,792 A | 12/1995 | Basset et al. |
| 5,479,868 A | 1/1996 | Bassett ............... 111/139 |
| 5,479,992 A | 1/1996 | Bassett |
| 5,485,796 A | 1/1996 | Bassett ............... 111/33 |
| 5,485,886 A | 1/1996 | Bassett ............... 172/763 |
| 5,497,717 A | 3/1996 | Martin ............... 111/191 |
| 5,497,837 A | 3/1996 | Kehrney ............... 172/619 |
| 5,499,683 A | 3/1996 | Bassett ............... 172/4 |
| 5,499,685 A | 3/1996 | Downing, Jr. |
| 5,517,932 A | 5/1996 | Ott et al. ............... 111/193 |
| 5,531,171 A | 7/1996 | Whitesel et al. ............... 111/121 |
| 5,542,362 A | 8/1996 | Bassett ............... 111/120 |
| 5,562,165 A | 10/1996 | Janelle et al. ............... 172/4 |
| 5,590,611 A | 1/1997 | Smith ............... 111/127 |
| 5,603,269 A | 2/1997 | Bassett ............... 111/52 |
| 5,623,997 A | 4/1997 | Rawson et al. |
| 5,640,914 A | 6/1997 | Rawson |
| 5,657,707 A | 8/1997 | Dresher et al. |
| 5,660,126 A | 8/1997 | Freed et al. |
| 5,685,245 A | 11/1997 | Bassett |
| 5,704,430 A | 1/1998 | Smith et al. |
| 5,709,271 A | 1/1998 | Bassett |
| 5,727,638 A | 3/1998 | Wodrich et al. ............... 172/414 |
| 5,852,982 A | 12/1998 | Peter ............... 111/118 |
| 5,868,207 A | 2/1999 | Langbakk et al. ............... 172/274 |
| 5,878,678 A | 3/1999 | Stephens et al. |
| RE36,243 E | 7/1999 | Rawson et al. |
| 5,970,891 A | 10/1999 | Schlagel |
| 5,970,892 A | 10/1999 | Wendling et al. |
| 5,988,293 A | 11/1999 | Brueggen et al. ............... 172/414 |
| 6,067,918 A | 5/2000 | Kirby ............... 111/121 |
| 6,164,385 A | 12/2000 | Buchl ............... 172/239 |
| 6,223,663 B1 | 5/2001 | Wendling et al. |
| 6,223,828 B1 | 5/2001 | Paulson et al. ............... 171/63 |
| 6,253,692 B1 | 7/2001 | Wendling et al. ............... 111/139 |
| 6,314,897 B1 | 11/2001 | Hagny |
| 6,325,156 B1 | 12/2001 | Barry |
| 6,330,922 B1 | 12/2001 | King ............... 172/166 |
| 6,331,142 B1 | 12/2001 | Bischoff ............... 460/112 |
| 6,343,661 B1 | 2/2002 | Thompson et al. ............... 172/444 |
| 6,382,326 B1 | 5/2002 | Goins et al. ............... 172/239 |
| 6,389,999 B1 | 5/2002 | Duello ............... 111/200 |
| 6,453,832 B1 | 9/2002 | Schaffert ............... 111/152 |
| 6,460,623 B1 | 10/2002 | Knussman et al. ............... 172/4 |
| 6,516,595 B2 | 2/2003 | Rhody et al. ............... 56/10.2 E |
| 6,575,104 B2 | 6/2003 | Brummelhuis |
| 6,644,224 B2 | 11/2003 | Bassett |
| 6,701,857 B1 | 3/2004 | Jensen et al. ............... 111/200 |
| 6,786,130 B2 | 9/2004 | Steinlage et al. ............... 91/390 |
| 6,834,598 B2 | 12/2004 | Juptner |
| 6,840,853 B2 | 1/2005 | Foth ............... 460/111 |
| 6,889,943 B2 | 5/2005 | Dinh et al. ............... 248/34 |
| 6,912,963 B2 | 7/2005 | Bassett |
| 6,986,313 B2 | 1/2006 | Halford et al. ............... 111/186 |
| 6,997,400 B1 | 2/2006 | Hanna et al. ............... 239/383 |
| 7,004,090 B2 | 2/2006 | Swanson ............... 111/119 |
| 7,044,070 B2 | 5/2006 | Kaster et al. |
| 7,063,167 B1 | 6/2006 | Staszak et al. ............... 172/328 |
| 7,222,575 B2 | 5/2007 | Bassett ............... 111/140 |
| 7,290,491 B2 | 11/2007 | Summach et al. ............... 111/181 |
| 7,360,494 B2 | 4/2008 | Martin ............... 111/164 |
| 7,360,495 B1 | 4/2008 | Martin ............... 111/164 |
| 7,438,006 B2 | 10/2008 | Mariman et al. ............... 111/164 |
| 7,451,712 B2 | 11/2008 | Bassett et al. |
| 7,523,709 B1 | 4/2009 | Kiest ............... 111/119 |
| 7,665,539 B2 | 2/2010 | Bassett et al. ............... 172/540 |
| 7,673,570 B1 | 3/2010 | Bassett ............... 111/63 |
| 7,743,718 B2 | 6/2010 | Bassett ............... 111/135 |
| 7,870,827 B2 | 1/2011 | Bassett ............... 111/119 |
| 8,146,519 B2 | 4/2012 | Bassett ............... 111/119 |
| 2004/0094079 A1 | 5/2004 | Bassett |
| 2005/0217550 A1 | 10/2005 | Bassett |
| 2006/0102058 A1 | 5/2006 | Swanson ............... 111/119 |
| 2006/0191695 A1 | 8/2006 | Walker et al. ............... 172/452 |
| 2006/0237203 A1 | 10/2006 | Miskin ............... 172/799.5 |
| 2007/0044694 A1 | 3/2007 | Martin ............... 111/121 |
| 2008/0093093 A1 | 4/2008 | Sheppard et al. ............... 172/2 |
| 2009/0025944 A1* | 1/2009 | Bassett ............... 172/1 |
| 2010/0108336 A1 | 5/2010 | Thomson et al. ............... 172/795 |
| 2010/0198529 A1 | 8/2010 | Sauder et al. ............... 702/41 |
| 2011/0088603 A1 | 4/2011 | Bassett ............... 111/121 |
| 2012/0060730 A1 | 3/2012 | Bassett ............... 111/149 |
| 2012/0060731 A1 | 3/2012 | Bassett ............... 111/149 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| GB | 1 574 412 | 9/1980 | ............... 111/123 |
| GB | 2 056 238 A | 10/1982 | |
| JP | 54-57726 | 5/1979 | ............... 74/529 |
| SU | 392897 | 10/1973 | |
| SU | 436778 | 7/1974 | |
| SU | 611201 | 6/1978 | ............... 74/527 |
| SU | 625648 | 9/1978 | |
| SU | 1410884 | 7/1988 | |
| SU | 1466674 | 3/1989 | ............... 111/124 |

OTHER PUBLICATIONS

Case Corporation Brochure, Planters 900 Series Units/Modules Product Information, Aug. 1986 (4 pages).
Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Acu-Grain, "*Combine Yield Monitor 99% Accurate*? 'You Bet Your Bushels!!'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Martin Industries, LLC Paired 13" Spading Closing Wheels Brochure, date estimated as early as Jun. 6, 2012, pp. 18-25 (8 pages).

* cited by examiner

AGRICULTURAL TILLAGE DEVICE

CROSS-REFERENCE TO RELATED APPLICATIONS

This application is a continuation-in-part of U.S. application Ser. No. 12/793,140, filed Jun. 3, 2010, which is a continuation of U.S. application Ser. No. 12/178,809, filed Jul. 24, 2007 (now U.S. Pat. No. 7,743,718), which claims the benefit of U.S. Provisional Application No. 60/961,726, filed Jul. 24, 2007, all of which are incorporated herein by reference in their entireties.

FIELD OF THE INVENTION

The present invention relates to agricultural implements and, more particularly, to agricultural devices for clearing and tilling the soil, and, if desired, simultaneously fertilizing the soil.

SUMMARY OF THE INVENTION

In one embodiment, an agricultural implement for tilling at least a strip of soil to be planted includes a tillage device for penetrating and tilling a strip of soil and displacing soil and residue upwardly, the tillage device including at least one coulter wheel mounted for rotation about a first axis of rotation and positioned at least in part below the soil, when tilling the strip of soil, such that the coulter wheel is able to cut a slit in the soil, and a depth control device laterally offset from the centerline of the strip of soil and mounted for rotation about a second axis of rotation located rearwardly of the trailing end of the tillage device. The depth control device is positioned to intercept soil and residue displaced upwardly by the tillage device, and has a soil-engaging surface for controlling the elevation of the implement such that the first axis of rotation and the second axis of rotation are fixed relative to each other. Multiple tines made of a polymeric material are mounted on the depth control device, extending laterally away from only one side of the depth control device toward the centerline to intercept a portion of the soil and residue displaced upwardly by the tillage device. The tines are attached to the depth control device only at one end of each tine with the attachment end of the tines located radially inwardly from the soil-engaging surface of the depth control device and the free ends of the tines terminating laterally short of the centerline and vertically between the elevations of the upper and lower edges of the depth control device, whereby the tines remain entirely above the soil engaged by the depth control device (i) as the depth control device rotates above the soil, and (ii) while the coulter wheel is positioned at least in part below the soil to cut a slit in the soil.

The coulter wheels and the depth control device may be carried on a common frame so that all of the axes of rotation are fixed relative to each other. The depth control device may be a gage wheel.

In another implementation, a second depth control device is mounted alongside or to some extent rearwardly of the axis of rotation of the first depth control device and on the opposite side of the tilled strip. Multiple tines extend horizontally away from the inboard surface of the second depth control device over a portion of the tilled strip with the free ends of the tines terminating laterally short of the centerline and vertically between the elevations of the upper and lower edges of the second depth control device. The free ends of the tines are preferably located radially inwardly from the other ends of the tines.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, the illustrative implement includes a leading residue-clearing sub-assembly 10 followed by a trailing tillage sub-assembly 11. Both sub-assemblies 10 and 11 are carried by a common elongated hollow frame 12 attached to the rear end of a four-bar linkage assembly 13, which in turn is attached to front frame 14 adapted to be connected to the tool bar of a tractor. Because both sub-assemblies 10 and 11 are carried by the same frame 12, the relative relationship of all the components of the two sub-assemblies 10 and 11 remains fixed so that they maintain a consistent set of dynamic properties governed by their relative sizes and positions rather than just the individual properties of the individual components.

As described in U.S. Pat. No. 6,644,224, the residue-clearing sub-assembly 10 comprises a coulter wheel 20 flanked by a pair of toothed wheels 21 and 22 overlapping a rear edge portion of the coulter wheel 20. The coulter wheel 20 cuts through the residue on the soil, such as stalks from a previous year's planting, and cuts a shallow slit in the soil. The trailing toothed residue-clearing wheels 21 and 22 then kick the cut residue off to opposite sides of the slit cut by the wheel 20, thus clearing a row for planting, while at the same time cleaning the coulter wheel 20. To this end, the front edges of the toothed wheels 21 and 22 are tilted inwardly toward the vertical plane of the coulter wheel 20 to assist in cleaning the coulter wheel, and the lower edges are tilted outwardly to assist in clearing the row to be planted. This arrangement is particularly well suited for strip tilling, where the strip cleared for planting is typically only about 10 inches of the 30-inch center-to-center spacing between planting rows.

The coulter wheel 20 and the two toothed wheels 21 and 22 are each journaled on a separate arm fastened rigidly to the frame 12, supported in such a way that, viewing a rear elevation, no frame member lies in a horizontal plane between the two coulter wheels in the sub-assembly 11 (described below). Thus, the hub assembly 20a of the coulter wheel is mounted on the lower end of an L-shaped arm 23 which is rigidly attached at its upper, rear end to the frame 12, and the hub assemblies 21a and 22a of the toothed wheels 21 and 22 are mounted on the lower ends of a pair of mounting arms rigidly attached to the frame 12. With this arrangement, the wheels 20-22 are all free to rotate relative to each other, but the relationship of their axes of rotation remains fixed.

The illustrative tillage device 11 comprises a pair of coulter wheels 30 and 31 which are offset from each other both laterally and fore and aft. The rear edges of the coulter wheels 30 and 31 are tilted inwardly toward the slit cut by the coulter wheel 20, and the lower edges are tilted outwardly. Thus, each of the coulter wheels 30 and 31 contacts the soil at an angle in two planes, which causes each wheel to apply a force to the soil that is upward and toward the center of the row, thereby displacing soil and residue upwardly. The aggregate effect that this angularity has on the soil is a turbulent swirling and mixing of the soil in the space between the two coulter wheels 30 and 31, which incorporates air and residue into the soil, as well as breaking the soil into finer pieces as well helping to mix fertilizer into the tilled soil. Soil thrown laterally by the leading coulter wheel 30 is caught by the coulter wheel 31 to retain that soil in the tilled area between the two coulter wheels 30 and 31 and to form a ridge for planting.

Alternative tillage devices, such as tillage shanks, may be used in place of the coulter wheels.

A gage wheel 32 (or multiple gage wheels or other gaging device such as a small belted caterpillar track or similar device) controls the depth to which the entire unit penetrates into the soil, and also intercepts soil and residue soil thrown upwardly and laterally by the rear coulter wheel 31, to retain that soil in the strip being tilled. This prevents soil loss from the tilled area and facilitates the creation of a ridge or berm, which is desirable for planting. Because the height of the axes of rotation of all the wheels 20-22 and 30-31 are fixed relative to the height of the axis of rotation of the gage wheel 32, the interaction among all the wheels remains essentially the same at all times.

The frame 12 is attached to the rear end of the four-bar linkage 13 that is attached at its forward end to the frame 14 adapted to be connected to the tool bar of a tractor or to a larger implement. The four-bar (sometimes referred to as "parallel-bar") linkage 13 is a conventional and well known linkage used in agricultural implements to permit the raising and lowering of tools attached thereto.

Figure 1:
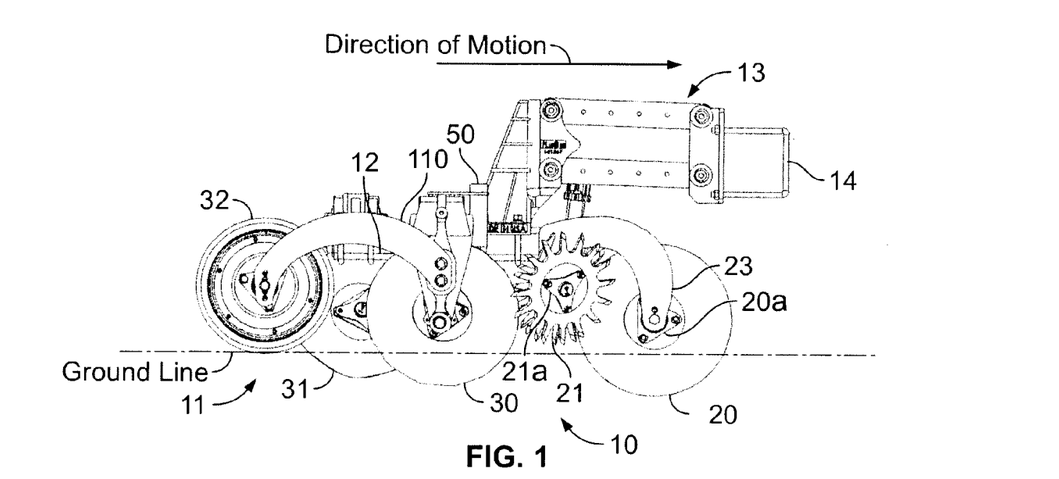
FIG. 1 is a side elevation of an agricultural implement embodying the invention.
Figure 2:
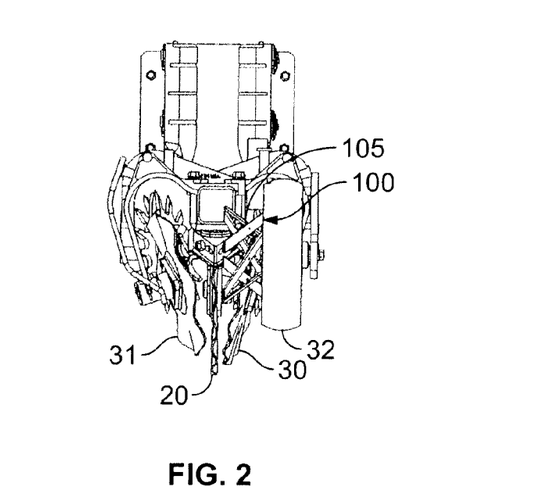
FIG. 2 is an end elevation taken from the left-hand end of FIG. 1.
Figure 3:
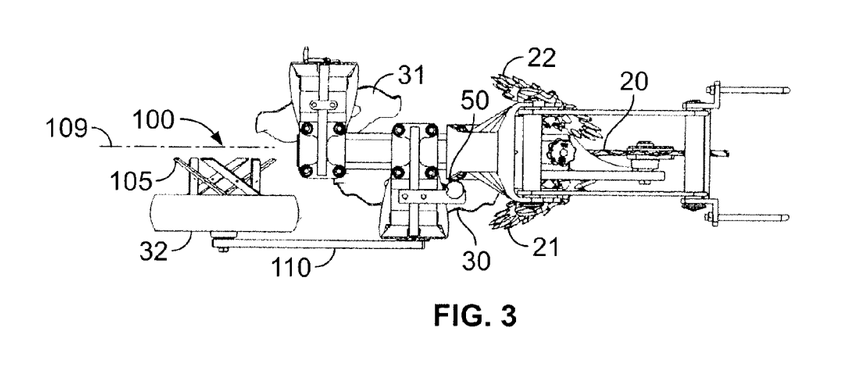
FIG. 3 is a top plan view of the modified embodiment shown in FIG. 1.

In the particular embodiment illustrated in FIGS. 1-3, all the coulter wheels 20, 30 and 31 are corrugated or fluted coulter wheels, but a wide variety of different coulter wheels are well known in the agricultural industry, and any of them may be used. The same is true of the residue-clearing wheels 21 and 22—a wide variety of different configurations of toothed wheels are well known in the agricultural industry for residue clearing, and any of them may be used.

It is typically desirable to apply fertilizer to the soil at the same time the soil is tilled. For this purpose, the illustrative row unit includes an optional fertilizer delivery tube 50 positioned to discharge dry fertilizer onto the soil in the space between the two coulter wheels 30 and 31. Liquid fertilizer may be delivered through a second tube, or a conventional injector may be used to deliver liquid fertilizers under pressure if desired.

By using rotating elements to clear and till the soil and form the clear strip or mound, the illustrative implement requires a relatively small amount of tractor power to pull through the soil. Having all rotating elements on a floating frame also permits the implement to operate in extremely rocky conditions by floating up and over rocks without lifting rocks to the surface where they interfere with field operations. Having all rotating elements also eliminates the need for knife or shank shear bolt or trip/reset protection systems in rocky areas.

The illustrative row unit is urged downwardly against the soil by its own weight. If it is desired to have the ability to increase this downward force, or to be able to adjust the force, a hydraulic or pneumatic cylinder and/or one or more springs may be added between the frame 12 and the linkage 13 or frame 14 to urge the frame 12 downwardly with a controllable force. Such a hydraulic cylinder may also be used to lift the row unit off the ground for transport by a heavier, stronger, fixed-height frame that is also used to transport large quantities of fertilizer for application via multiple residue-clearing and tillage row units. This hydraulic or pneumatic cylinder may be controlled to adjust the downward force for different soil conditions such as is described in U.S. Pat. Nos. 5,709, 271, 5,685,245 and 5,479,992.

To facilitate the use of the illustrative implement as an attachment to a larger implement such as a planter, an attachment plate may be provided at the end of the frame 12 to serve as an interface with the larger implement. A few bolts may then be used to attach the implement as a striptill row unit on a planter or other larger implement. Alternatively, a planter row unit may be attached to the rear of the frame 12 to plant seed directly in the cleared strip as a one-pass tillage and planting machine.

The strip till operation may be completed in the fall after harvest of the previous crop or in the early spring prior to planting time. The user of the implement of this invention may gain further extended seasonal use from his equipment by utilizing at least a portion the implement as a carrier for a seeding unit in the spring. A seeding unit such as the John Deere "Max-Emerge" planter row unit, the seeding system described in U.S. Pat. No. 5,603,269, or other known seeding apparatus may be removably attached to the frame 12 to provide a multi-use tool that reduces the number of separate implements required on a farm.

A swirl device 100 is attached to the central portion of the inboard side of the gage wheel 32, which is located rearwardly of the tillage device and positioned to intercept soil and residue displaced upwardly by the tillage device. The swirl device 100 rotates with the gage wheel 32 and helps to control the distribution of soil moving toward the gage wheel from the rearmost of the coulter wheels 20, 30 and 31. The swirl device 100 intercepts a portion of the soil and residue thrown upwardly and laterally toward the gage wheel 32 by the coulter wheel 31 and distributes the intercepted soil and residue across the tilled strip adjacent the gage wheel. The swirl device 100 also helps to break up clumpy soil. Because the outside diameter of the swirl device 100 is smaller than the outside diameter of the gage wheel 32, the swirl device 100 operates above ground level and does not dig into the earth. Another benefit of the swirl device 100 is that it produces thorough incorporation of fertilizer, especially dry fertilizer, with the soil within the worked strip where it is needed by the plants, rather than leaving the fertilizer in concentrated ribbons. This allows the application of more fertilizer in the strip, possibly just ahead of the planter by a few hours, without burning the seed, and may eliminate a second trip to side dress. The total amount of fertilizer applied to produce optimum crop yields may even be reduced. Fertilizer that is not thoroughly incorporated in the soil may be lost to the atmosphere or runoff, which is costly and may pollute both ground water and surface water.

Figure 4:
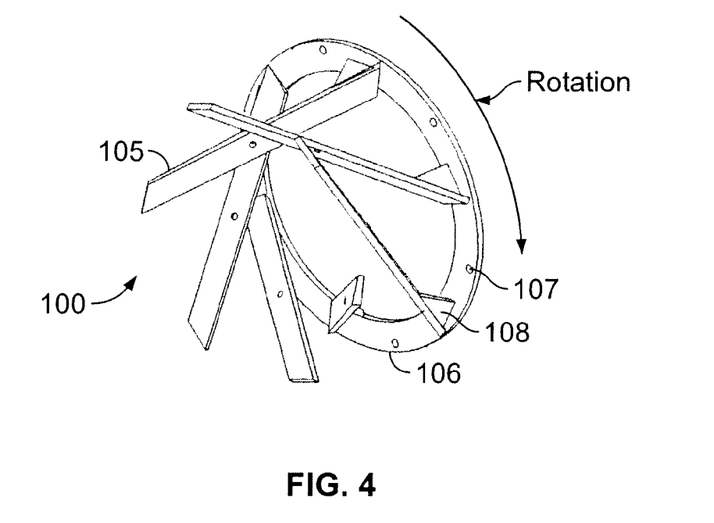
FIG. 4 is a perspective of the swirl device included in the modified embodiment of FIGS. 1-3.
Figure 5:
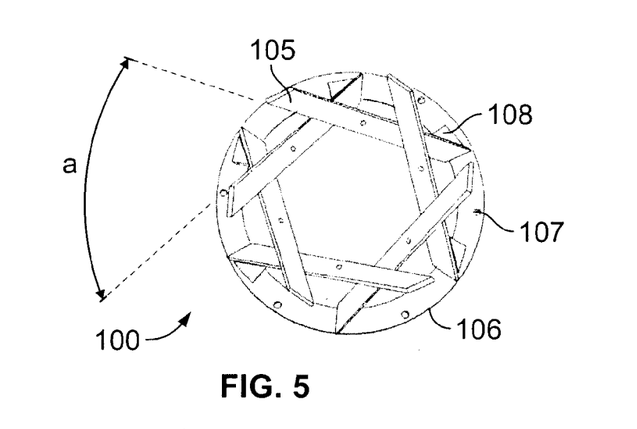
FIG. 5 is a side elevation of the swirl device of FIG. 4.
Figure 6:
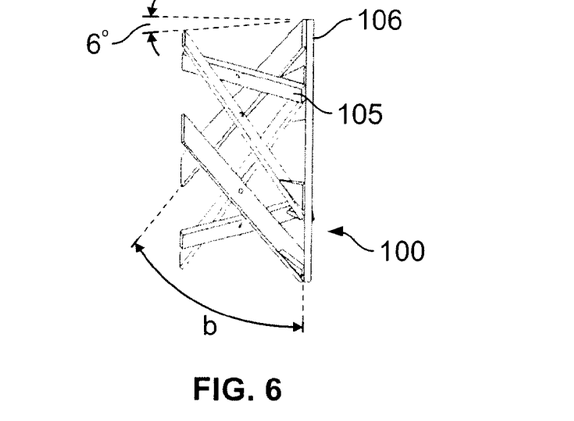
FIG. 6 is an end elevation of the swirl device of FIG. 4.

As can be seen in FIGS. 4-6, the swirl device 100 comprises multiple tines 105 that extend laterally away from the surface of an annular vertical mounting base 106 attached to the gage wheel 32 by multiple screws passed through holes 107 in the base 106. The end of each tine 105 that is attached to the base 106 is bent to form a short mounting tab 108 that is fastened to the mounting base 106 by welding. The main body portion of each tine 105 extends horizontally away from the surface of the mounting base 106 (see FIGS. 7-10), and vertically along a chord of the annular base 106, i.e., of the gage wheel. In the illustrative embodiment, six tines 105 are used, with adjacent tines overlapping each other at an angle a of about 60° in a vertical plane (see FIG. 5), and each tine 105 intersects the mounting base at an angle b of 40.5° (see FIG. 6).

As can be seen in FIG. 3, the length of the tines 105 is such that the free ends of the tines terminate laterally over the tilled strip, on the gage wheel side of the centerline 109 of the tilled strip. Vertically, the free ends of all the tines are located between the elevations of the upper and lower edges of the gage wheel 32 (or any other soil engaging device on which the swirl device is mounted). The free ends of the tines are located radially inwardly from the inner ends of the tines attached to the base 106, forming a conical envelope such as the 6° envelope depicted in FIG. 6. It will be understood that different numbers of tines and/or different angles may be used in modified embodiments.

The swirl device 100 improves the uniformity of the distributed soil, and also permits a strip tilling operation to be carried out at higher speeds, e.g., greater than 8 miles per hour in clumpy or otherwise wet soil conditions common to spring use.

The two rear coulter blades 30 and 31 run at angles that have the effect of lifting the soil. As speed increases the unit creates a turbulent stream of soil moving through the center of the row unit. Because the unit is asymmetric, with the rear coulter blades 30 and 31 are staggered, there is a tendency at times for the soil coming off the rear blade to be shifted too far toward the gage wheel 32 on the right hand side of the row. The swirl device 100 interacts with the upwardly displaced soil while it is in the air, not on the ground. Thus, the swirl 100 performs two primary functions and one secondary function, i.e., it redirects the flow of soil moving through the center of the unit toward the other side slightly, breaks up clods, and mixes fertilizer.

The helical pitch of the swirl tines has the effect of blowing the soil like a fan blade while the soil is in the air, pushing the soil toward the center of the row and creating a better berm. It is not just the soil coming off the rear blade that interacts with the swirl, but rather the whole mass flow moving through the center of the unit which is lifted by both coulter blades 30 and 31.

Changing the pitch angle of the tines of the swirl device 100 changes the proportion of blowing the soil one direction versus beating the soil into smaller pieces. And in that way the desired angle can change with fairly minor design variations in the whole unit.

The embodiment of FIGS. 1-3 includes an elongated, arched arm 110 extending rearwardly from the support frame of the middle coulter wheel 30, for carrying the gage wheel 32. This longer, arched arm 110 increases the clearance for mud buildup between the gage wheel 32 and the coulter wheel 30. The arched shape also reduces interference with residue flow when the row units are not in a staggered configuration.

Figure 7:
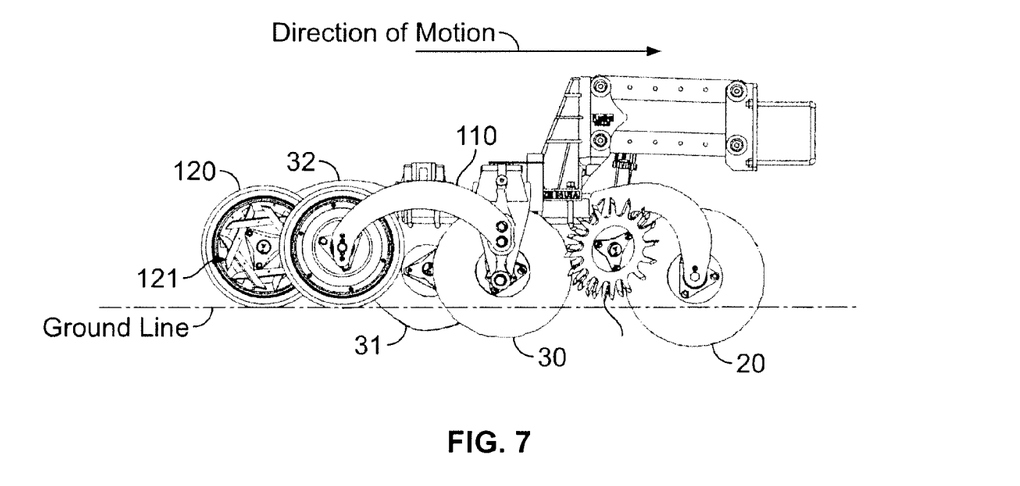
FIG. 7 is a side elevation of a modified embodiment.
Figure 8:
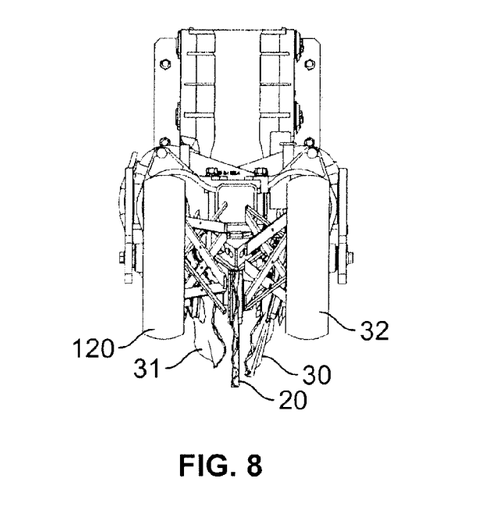
FIG. 8 is an end elevation taken from the left-hand end of FIG. 7.
Figure 9:
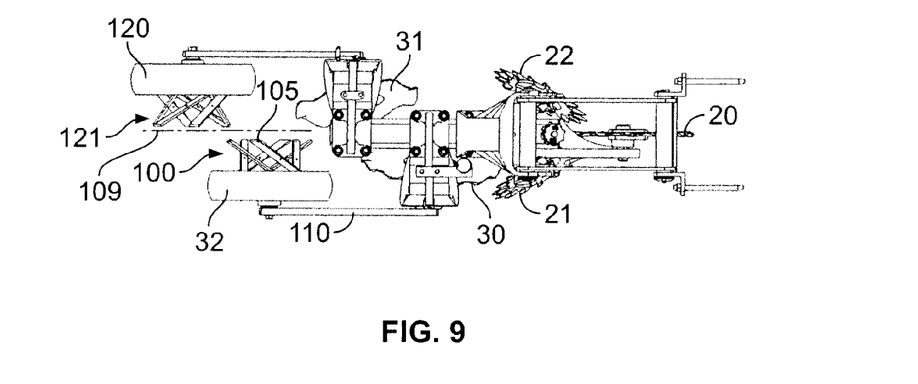
FIG. 9 is a top plan view of the modified embodiment shown in FIG. 7.

FIGS. 7-9 illustrate a modified embodiment that utilizes a second gage wheel 120 and a second swirl device 121, located on the opposite side of the centerline 109 of the tilled strip from the gage wheel 32 and its swirl device 100. The axis of rotation of the second gage wheel 120 and its swirl device 121 is positioned rearwardly of the axis of rotation of the gage wheel 32 and its swirl device 100, with the two gage wheels 32 and 120 partially overlapping in the direction of movement of the implement. Alternatively, the two wheels/swirls can be mounted directly side by side and still work well. In general, staggering the rolling devices allows material to flow through more easily.

The second swirl device 121 is mounted on the inboard side of the second gage wheel 120, so that the two swirl devices 100 and 121 are located on opposite sides of the centerline 109, with the rearmost swirl device 121 receiving much of the soil and residue exiting from the first swirl device 100. The second swirl device 121 interacts primarily with the volume of soil and residue passing through the center of the unit which is not affected by the first swirl device 100. In this way the second swirl allows for a more complete job. Its effect becomes more pronounced at higher speeds as the volume of material moving through the unit increases. One of the important functions of the second gage wheel 120 and its swirl device 121 is to contain the flow of soil moving through the unit at high speed, preventing the soil from escaping the intended tilled area. This dual arrangement produces additional turbulence in the flow of soil and residue, and results in even more uniform distribution of loosened soil and residue across the width of the tilled strip.

In FIGS. 7-9, all the elements that are common to the embodiment of FIGS. 1-6 are identified by the same reference numerals used to identify those elements in the first embodiment.

A modified embodiment of the swirl device is illustrated in FIGS. 10-15. The tines 200 in this embodiment are made of a polymeric material such as ultra high density (UHMW) polyethylene. It has been found that the surface of the polymeric material is less likely to adhere to soil and debris than a metal surface, as depicted diagrammatically in FIGS. 12A (polymeric tine) and 12B (metal tine). The tines 200 are sufficiently thin that they bend slightly during rotation of the gage wheel, as depicted in FIGS. 13A, 14A and 14B. This bending further reduces the accumulation of soil and debris on the tines, particularly when the soil and debris are wet. Even when soil initially adheres to a polymeric tine, the bending of the tine as depicted in FIG. 13A produces a curved surface that opens a gap between the tine surface and adhering soil or mud, causing the soil or mud to become detached from the tine, as depicted in FIGS. 14A and 14B. It can be seen from FIG. 13A that the tines tend to bend in opposite directions during each revolution of the gage wheel, thereby producing opposites directions of curvature in each tine surface, i.e., producing both convex and concave curvatures. FIGS. 13B and 14C depict the smaller degrees of bending that occur with a metal tine 130, as contrasted with the larger degrees of bending depicted in FIGS. 13A, 14A and 14B for a polymeric tine 200.

For optimum bending, it is preferred that the polymeric tines have a thickness in the range of from about 1/8 inch to about 3/8 inch and a width in the range of from about 3/4 inch to about 2 inches. The length of each tine preferably does not extend past a theoretical centerline that is equidistant from the two gage wheels, or past the centerline of the entire row unit if only one gage wheel is used.

Figure 10:
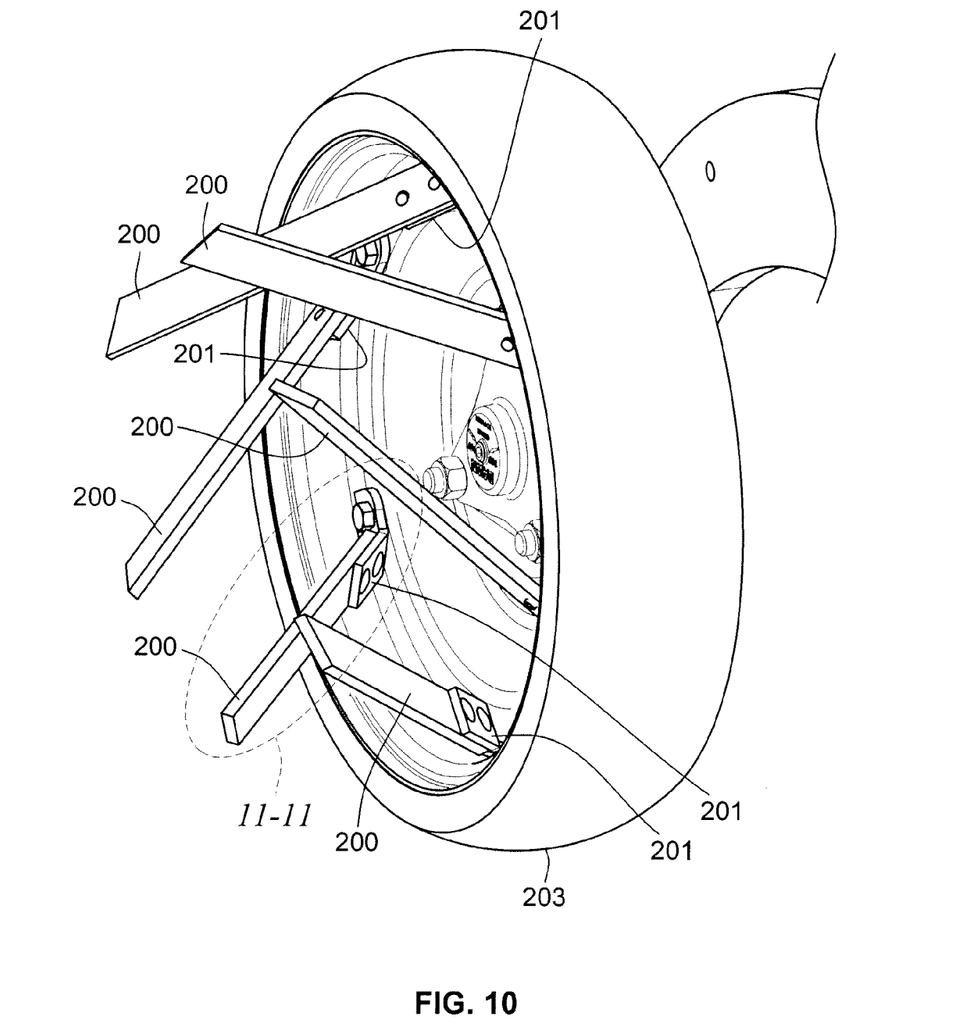
FIG. 10 is a perspective view of a modified agricultural implement embodying the invention.
Figure 11:
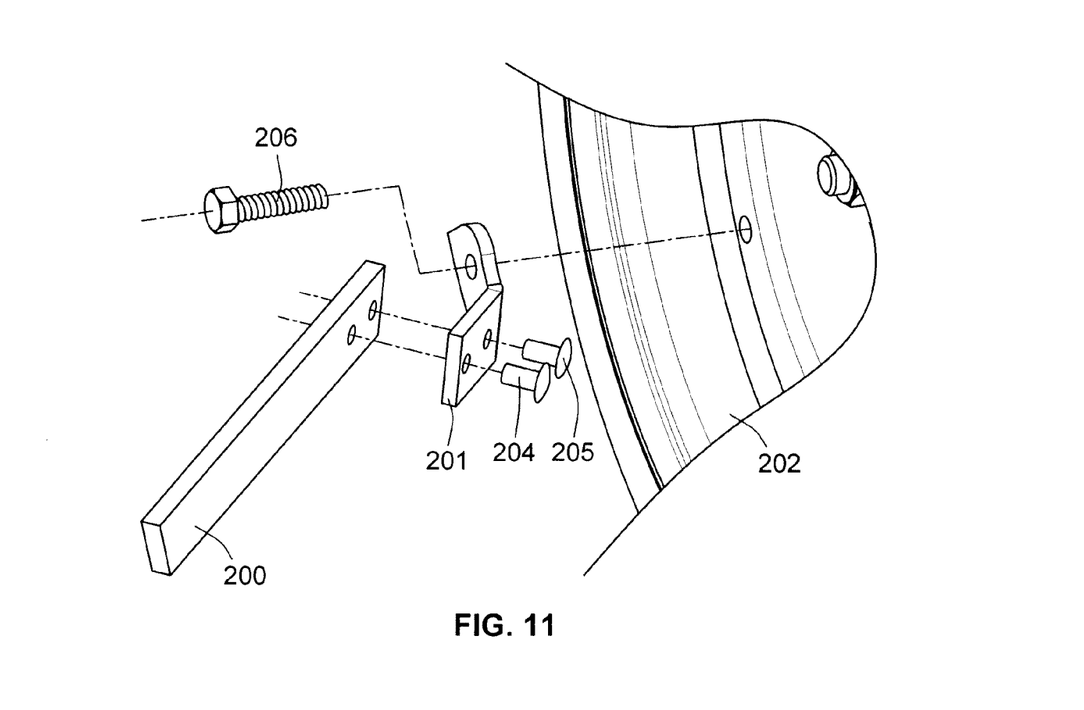
FIG. 11 is an exploded perspective of a segment of the implement of FIG. 10.
Figure 12A:
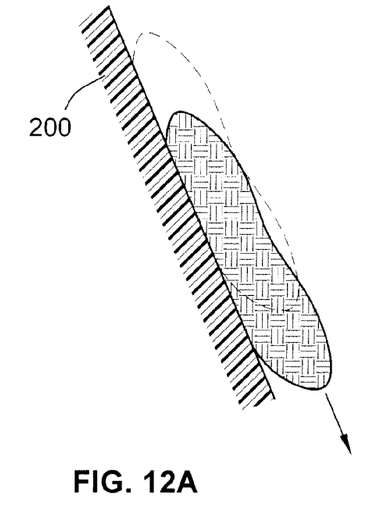
FIGS. 12A and 12B are diagrammatic illustrations of the interaction of mud with different materials capable of being used in the implement of FIGS. 10 and 11.
Figure 12B:
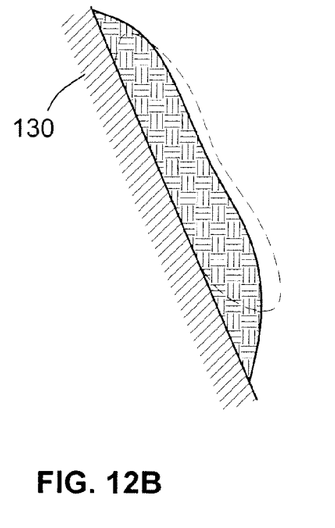
Figure 13A:
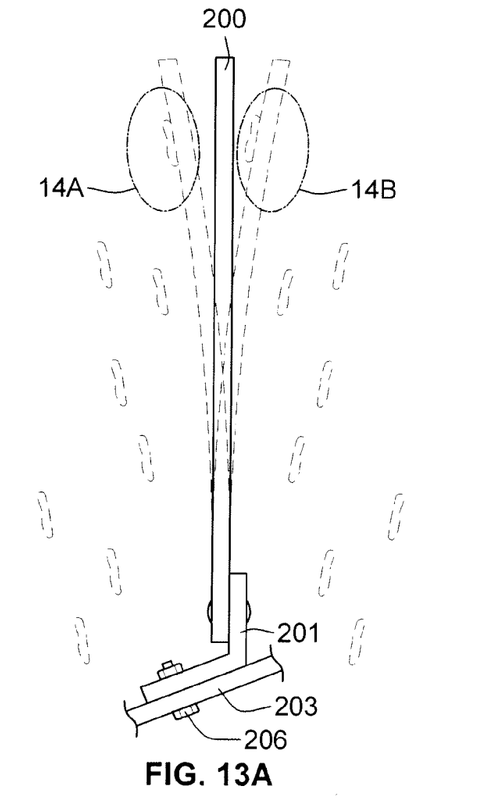
FIGS. 13A and 13B are enlarged side elevations of one of the tines in the implement of FIGS. 10 and 11 along with diagrammatic illustrations of how the blade interacts with globules of mud when in operation.
Figure 13B:
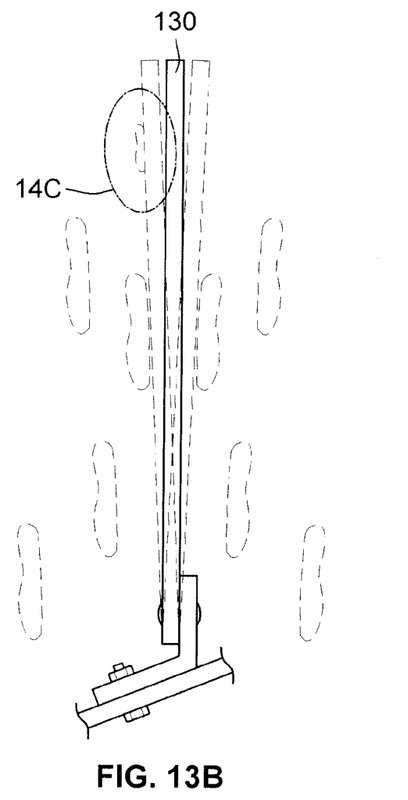
Figure 14A:
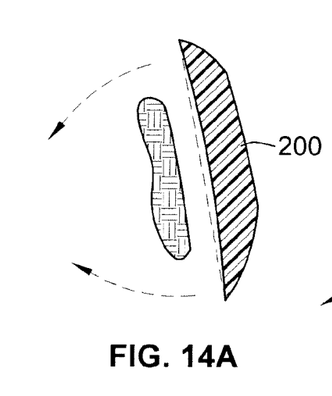
FIGS. 14A-14C are diagrammatic illustrations of the interaction of mud with tines made of different materials.
Figure 14B:
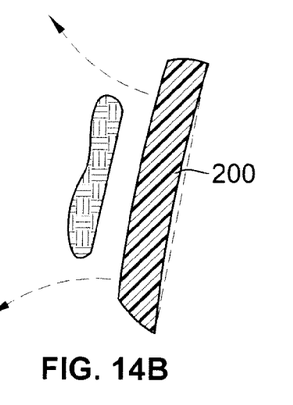
Figure 14C:
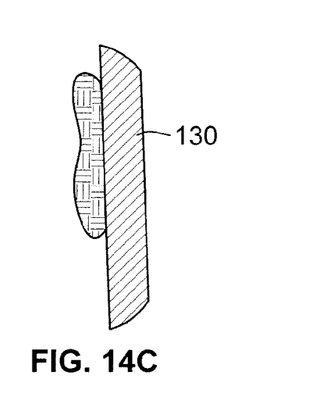
Figure 15:
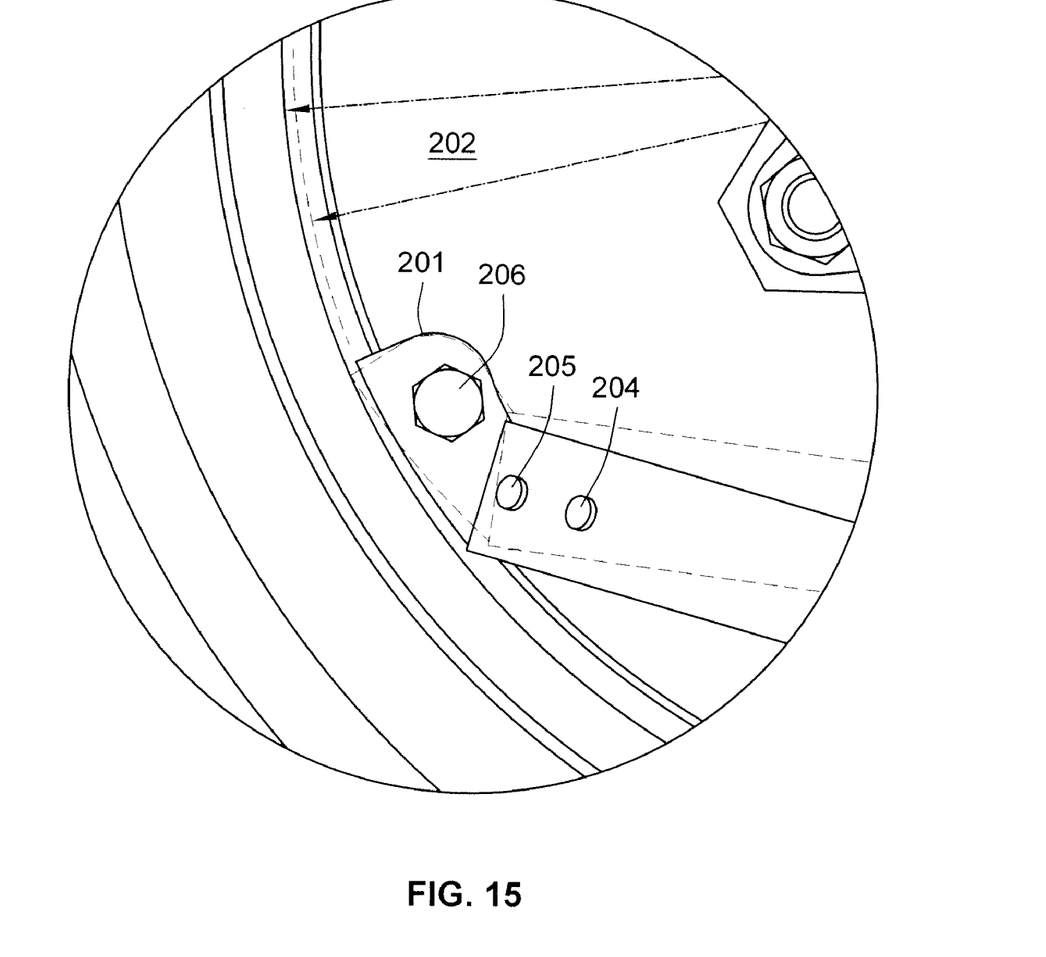
FIG. 15 is an enlarged side elevation of a segment of the implement of FIG. 10.

As can be seen in FIGS. 10, 11 and 15, the radially inner end of each tine 200 is attached to a bracket 201 adapted to be attached directly to the rim 202 of a gage wheel 203. Each polymeric tine is attached to its bracket 201 by a pair of rivets 204 and 205, and each bracket 201 is attached to the wheel rim 202 by a bolt 206, so that individual tines can be replaced by simply removing the bolt 206 then re-using the bolt to attach a new tine and bracket. As can be seen in FIG. 15, the base of each bracket 201 is profiled to match the contour of the wheel rim 202 so that the bracket cannot rotate around the axis of the bolt 206 after the bolt has been tightened to draw the bracket base into firm engagement with the rim 202.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural implement for tilling at least a strip of soil to be planted, comprising
    a tillage device for penetrating and tilling a strip of soil and displacing soil and residue upwardly, said tillage device including at least one coulter wheel mounted for rotation about a first axis of rotation and positioned at least in part below the soil, when tilling said strip of soil, such that said coulter wheel is able to cut a slit in the soil;
    a depth control device laterally offset from the centerline of said strip of soil and mounted for rotation about a second axis of rotation located rearwardly of the trailing end of said tillage device, said depth control device being positioned to intercept soil and residue displaced upwardly by said tillage device, said depth control device having a soil-engaging surface for controlling the elevation of said implement such that the first axis of rotation and the second axis of rotation are fixed relative to each other; and
    multiple tines made of a polymeric material, mounted on said depth control device, and extending laterally away from only one side of said depth control device toward said centerline to intercept a portion of the soil and residue displaced upwardly by said tillage device, said tines being attached to said depth control device only at one end of each tine with the attachment end of said tines located radially inwardly from said soil-engaging surface of said depth control device and the free ends of said tines terminating laterally short of said centerline and vertically between the elevations of the upper and lower edges of said depth control device, whereby said tines remain entirely above the soil engaged by said depth control device (i) as said depth control device rotates above the soil, and (ii) while said coulter wheel is positioned at least in part below the soil to cut a slit in the soil.

2. The agricultural implement of claim 1 in which each of said tines is sufficiently thin that it bends during rotation of said depth control device.

3. The agricultural implement of claim 2 in which each of said tines has a thickness in the range of from about 1/8 inch to about 3/8 inch.

4. The agricultural implement of claim 1 in which said depth control device includes a metal rim, and each of said polymeric tines is attached to a metal bracket attached to said metal rim.

5. The agricultural implement of claim 4 in which each of said polymeric tines is attached to said bracket with rivets, and said bracket is attached to said rim with at least one bolt so that said bracket can be detached from and re-attached to said rim.

6. The agricultural implement of claim 1 in which said tillage device comprises first and second coulter wheels that are offset from each other both laterally and fore and aft, said first and second coulter wheels overlapping each other fore and aft with the trailing edge of each of said first and second coulter wheels located closer to the path of the other coulter wheel than the leading edge of the same coulter wheel.

7. The agricultural implement of claim 6 wherein the rearward edges of said first and second coulter wheels are tilted inwardly, and the lower edges of said first and second coulter wheels are tilted inwardly.

8. The agricultural implement of claim 6 which includes a common frame carrying said first and second coulter wheels so that said axes of rotation are fixed relative to each other.

9. The agricultural implement of claim 1 in which the free ends of said tines are located radially inwardly from the attachment ends of said tines.

10. The agricultural implement of claim 1 in which said depth control device is a gauge wheel, and each of said tines extends vertically along a chord of said depth control device when viewed in a side elevation of said depth control device from the free ends of said tines.

11. The agricultural implement of claim 8 in which each of said tines forms an acute angle with respect to a vertical plane passing through said depth control device.

12. The agricultural implement of claim 1 in which adjacent tines overlap each other when viewed in a side elevation of said depth control device from the free ends of said tines.

13. The agricultural implement of claim 1 which includes a second depth control device mounted for rotation about an axis of rotation located rearwardly of the axis of rotation of said first depth control device and said first and second depth control devices are located on opposite sides of the tilled strip, and
    multiple polymeric tines mounted on said second depth control device and extending laterally away from said second depth control device toward said centerline to intercept a portion of the soil and residue displaced upwardly by said tillage device, said tines on said second depth control device being attached to said second depth control device only at one end of each tine, the free ends of said tines terminating laterally short of said centerline and vertically between the elevations of the upper and lower edges of said second depth control device.

14. The agricultural implement of claim 1, wherein each one of said tines is prone to bending in opposite directions to produce both convex and concave curvatures during each revolution of said depth control device.

15. A method of tilling soil to be planted, comprising
    tilling at least a strip of the soil with a tillage device that penetrates and tills a strip of soil and displaces soil and residue upwardly;

inserting at least in part a coulter wheel into the soil to cut a slit, said coulter wheel being mounted for rotation about a first axis of rotation;

controlling the depth of said tillage device with a depth control device laterally offset from the centerline of said strip of soil and mounted for rotation about a second axis of rotation located rearwardly of the trailing end of said tillage device, said depth control device being positioned to intercept soil and residue displaced upwardly by said tillage device, said depth control device having a soil-engaging surface for controlling the elevation of said implement such that the first axis of rotation and the second axis of rotation are fixed relative to each other; implement, and rotating said depth control device above the soil while said coulter wheel is inserted into the soil for cutting said slit;

intercepting entirely above the soil a portion of the soil and residue displaced upwardly by said tillage device, with multiple tines made of a polymeric material, mounted on said depth control device, and extending laterally away from only one side of said depth control device toward said centerline, said tines being attached to said depth control device only at one end of each tine with the attachment end of said tines located radially inwardly from said soil-engaging surface of said depth control device and the free ends of said tines terminating laterally short of said centerline and vertically between the elevations of the upper and lower edges of said depth control device, whereby said tines remain entirely above the soil engaged by said depth control device as said depth control device rotates.

16. The method of claim 15 in which each of said tines is sufficiently thin that it bends during rotation of said depth control device.

17. The method of claim 15 in which each of said tines has a thickness in the range of from about ⅛ inch to about ⅜ inch.

18. The method of claim 15 in which said depth control device includes a metal rim, and each of said polymeric tines is attached to a metal bracket attached to said metal rim.

19. The method of claim 18 in which each of said polymeric tines is attached to said bracket with rivets, and said bracket is attached to said rim with at least one bolt so that said bracket can be detached from and re-attached to said rim.

20. The method of claim 15 in which the free ends of said tines are located radially inwardly from the attachment ends of said tines.

* * * * *